United States Patent
Chou et al.

(10) Patent No.: US 7,158,712 B2
(45) Date of Patent: Jan. 2, 2007

(54) OPTICAL FIBER COUPLER AND MANUFACTURING APPARATUS AND METHOD THEREOF

(75) Inventors: Cheng-Tsa Chou, Taipei (TW); Li-Ming Liou, Taoyuan County (TW)

(73) Assignee: Coretech Optical Co., Ltd., Hsinchu (TW)

( * ) Notice: Subject to any disclaimer, the term of this patent is extended or adjusted under 35 U.S.C. 154(b) by 0 days.

(21) Appl. No.: 11/123,050

(22) Filed: May 6, 2005

(65) Prior Publication Data

US 2006/0251374 A1    Nov. 9, 2006

(51) Int. Cl.
*G02B 6/36*    (2006.01)
*G02B 6/00*    (2006.01)

(52) U.S. Cl. ............ 385/137; 385/136; 385/65; 385/83

(58) Field of Classification Search .......... None
See application file for complete search history.

(56) References Cited

U.S. PATENT DOCUMENTS

| | | | | |
|---|---|---|---|---|
| 3,302,843 A * | 2/1967 | Sheehan | ................. | 229/108 |
| 3,586,563 A * | 6/1971 | Fukkami et al. | ........... | 156/174 |
| 3,846,010 A * | 11/1974 | Love et al. | ................. | 385/54 |
| 4,676,590 A * | 6/1987 | Priaroggia | ................. | 385/113 |
| 4,735,479 A * | 4/1988 | Nicholls | ................. | 385/83 |
| 4,815,814 A * | 3/1989 | Ulijasz | ................. | 385/114 |
| 5,006,201 A * | 4/1991 | Kaukeinen | ................. | 216/24 |
| 5,376,201 A * | 12/1994 | Kingstone | ................. | 156/174 |
| 5,668,912 A * | 9/1997 | Keller | ................. | 385/100 |
| 5,862,285 A * | 1/1999 | Danielian et al. | ........... | 385/121 |
| 5,882,173 A * | 3/1999 | Ziegler | ................. | 414/788 |
| 6,259,843 B1 * | 7/2001 | Kondo | ................. | 385/104 |
| 6,299,361 B1 * | 10/2001 | Sasaki et al. | ................. | 385/59 |
| 6,760,523 B1 * | 7/2004 | V. Nechitailo | ........... | 385/112 |
| 6,841,735 B1 * | 1/2005 | Schilson et al. | ........... | 174/117 F |
| 6,928,218 B1 * | 8/2005 | Nakata et al. | ................. | 385/116 |
| 2002/0048427 A1 * | 4/2002 | Chiarulli et al. | ........... | 385/24 |
| 2002/0197031 A1 * | 12/2002 | Nechitailo | ................. | 385/112 |
| 2003/0068147 A1 * | 4/2003 | Nechitailo | ................. | 385/114 |
| 2004/0076386 A1 * | 4/2004 | Nechitailo | ................. | 385/100 |
| 2005/0281518 A1 * | 12/2005 | Tanaka et al. | ................. | 385/114 |

* cited by examiner

*Primary Examiner*—Frank G. Font
*Assistant Examiner*—Erin Chiem
(74) *Attorney, Agent, or Firm*—Harness, Dickey & Pierce, P.L.C.

(57) ABSTRACT

An optical fiber coupler and manufacturing apparatus and method thereof aim to provide a loading fixture and a clamping device to fabricate 1×4, 2×4 and 4×4 optical fiber couplers, and also improve driving mechanisms and operation of the packaging station and the entire manufacturing equipment. The 1×4 optical fiber coupler fabricated by means of the invention can split an optical signal more evenly and has a higher production yield. The total size of the equipment is smaller and the structure is less complicated, and the construction cost is lower.

4 Claims, 5 Drawing Sheets

OPTICAL FIBER COUPLER AND MANUFACTURING APPARATUS AND METHOD THEREOF

FIELD OF THE INVENTION

The present invention relates to an optical fiber coupler and manufacturing apparatus and method thereof, and particularly to an 1×4 optical fiber coupler structure and improvements on a loading fixture, a clamping device, a packaging device and a conveying mechanism for the manufacturing apparatus and method thereof.

BACKGROUND OF THE INVENTION

Optical communication technology has made great progress in recent years. In the past, optical fiber communication technology and optical fiber communication elements mainly were used on backbone networks. These days they are widely used in metropolitan optical communication networks. The vision of Fiber-To-The-Home (FTTH) is achievable in the near future.

The optical fiber coupler, also called optical fiber splitter, is an essential element to implement FTTH. The optical fiber coupler usually is fabricated through a fused biconical tapered fiber coupling technique. The optical fiber passive device thus made costs less and has excellent optical characteristics. It is suitable for mass production. Hence it is widely used in the industry. In the earlier days, the technology mainly focuses on 1×2 optical fiber coupler. With the rapid advance of optical communication technology, now 1×4 optical fiber couplers have gradually become the mainstream. Hence to provide a new and desired apparatus and method to manufacture optical fiber couplers, such as a clamping device, a packaging device and the like is important.

Moreover, fabrication of the optical fiber couplers at present mostly is semi-automatic. In general, the manufacturing process of the optical fiber couplers includes at least two main stages: one is stretching optical fibers, another is packaging the stretched optical fibers. As a clamping device, the optical fiber fusion splice device and packaging device have to be moved during fabrication. Conveying mechanisms are needed to do transportation. In conventional techniques, individual device such as a clamping device, optical fiber fusion splice device, packaging device and the like are moved by individual and independent conveying mechanisms. This is more expensive and the equipment cannot be made as compact as desired.

SUMMARY OF THE INVENTION

In view of the aforesaid problems occurring to the conventional techniques of fabricating optical fiber couplers, such as lacking suitable 1×4 clamping devices, and packaging device and conveying mechanisms being too complicated and too bulky, one of the objects of the present invention is to provide a loading fixture for manufacturing optical fiber couplers that has a groove on the top surface to hold a fourth optical fiber among a first optical fiber, a second optical fiber and a third optical fiber in a close contact manner. The connection lines between the center of the fourth optical fiber and the centers of the first optical fiber, second optical fiber and third optical fiber form three included angles, in which two are ranged from 90 to 120 degrees.

Based on the loading fixture set forth above, the invention further provides an optical fiber coupler to split the optical signal of the fourth optical fiber to the first, second and third optical fibers. It has the same characteristics as previously discussed. Namely the first, second and third optical fibers are located on the periphery of the fourth optical fiber, and the connection lines between the center of the fourth optical fiber and the centers of the first optical fiber, second optical fiber and third optical fiber form three included angles in which two are ranged from 90 to 120 degrees.

By means of the loading fixture set forth above, the invention further provides a method for manufacturing optical fiber couplers that includes steps of: providing a loading fixture which has the aforesaid characteristics, and placing a first optical fiber, a second optical fiber, a third optical fiber and a fourth optical fiber in a groove of the loading fixture, in arrangement as previously discussed.

In one aspect, the invention further provides a clamping device for manufacturing optical fiber couplers that mainly includes a holding stage, a loading fixture and a clamping member. The loading fixture is located on the top surface of the holding stage and has the characteristics mentioned above. The clamping member comprises a plurality of clamping arms pivotally coupled on one side of the top surface of the holding stage that the clamping arms may be turned to cover and press the optical fibers and the top surface of the loading fixture when the optical fibers are placed on the loading fixture.

In another aspect, the invention provides a packaging device for manufacturing optical fiber couplers that mainly includes a pedestal, a screw bar and a pair of carriers. The screw bar has two sections that have opposite screw threads formed respectively on the peripheral surface, and run horizontally through the base. The two carriers have screw holes with opposite screw threads to couple with the screw bar, and jointly hold a packaging substrate the top to package an optical fiber coupler. When the screw bar rotates, the two carriers are moved to reduce or increase the interval there between.

In yet another aspect, the invention provides an apparatus for manufacturing optical fiber couplers that includes a base, a pair of clamping devices, an optical fiber fusion splice device, a packaging device and a plurality of conveying units. The clamping device aims to clamp a plurality of optical fibers. The optical fiber fusing device aims to heat a bare portion of the optical fibers. The packaging device holds a packaging substrate to package the bare portion of the optical fibers. The conveying units are mounted onto the base to hold and transport the clamping device, optical fiber fusion splice device and packaging station during stretching and packaging processes of the optical fibers. The packaging station and the optical fiber fusion splice device are connected through a linkage bar. The conveying units drive the packaging station and the optical fiber fusion splice device to move synchronously. When the front end of the optical fiber fusion splice device is moved above an optical fiber stretching axis, the packaging station is moved away from the optical fiber stretching axis. When the packaging station is moved below the optical fiber stretching axis, the optical fiber fusion splice device is moved away from the optical fiber stretching axis.

Through the apparatus for manufacturing optical fiber couplers set forth above, the invention further provides a method for manufacturing optical fiber couplers. The method includes: coupling the packaging station and the optical fiber fusion splice device through the linkage bar; moving the packaging station and the optical fiber fusion splice device synchronously through the conveying units; moving the packaging station away from the optical fiber stretching axis when the front end of the optical fiber fusion splice device is moved above the optical fiber stretching axis, and moving the optical fiber fusion splice device away from the optical fiber stretching axis when the packaging station is moved below the optical fiber stretching axis.

Finally, the invention further provides an optical fiber coupler according to the apparatus and method for manufacturing optical fiber couplers set forth above. The optical fiber coupler includes a first optical fiber, a second optical fiber, and a third optical fiber surrounding the periphery of a fourth optical fiber. The connection lines between the center of the fourth optical fiber and the centers of the first optical fiber, second optical fiber and third optical fiber form three included angles in which two are ranged from 90 to 120 degrees.

In short, the invention mainly aims to provide a loading fixture, a clamping device and a packaging station in the manufacturing process for fabricating 1×4, 2×4 or 4×4 optical fiber couplers. It also improves the driving mechanism and operation of the manufacturing apparatus of the optical fiber couplers. The size of the apparatus is greatly reduced, and the building costs are lower. The reliability and production yield of the manufacturing system of the optical fiber coupler also is enhanced.

The foregoing, as well as additional objects, features and advantages of the invention will be more readily apparent from the following detailed description, which proceeds with reference to the accompanying drawings.

DESCRIPTION OF THE PREFERRED EMBODIMENTS

The present invention mainly aims to provide a 1×4, 2×4 or 4×4 optical fiber coupler, and an apparatus and method for manufacturing the optical fiber coupler. The apparatus includes a loading fixture, a clamping device, a packaging station and a driving mechanism. Details will be elaborated as follows. It is to be noted that the apparatus is not limited to manufacturing the 1×4, 2×4 or 4×4 optical fiber coupler. By changing different loading fixtures, it can also be used to fabricate 1×2, WDM (Wavelength Division Multiplexer) and WBC (Wide-Band Couplers) optical fiber couplers that function differently.

Refer to FIGS. 1 through 5 for a first embodiment of the clamping device for fabricating the optical fiber coupler according to the invention. In general, two symmetrical clamping devices are to be used in a cooperative manner. The following discussion is based on one clamping device 100.

Figure 1:
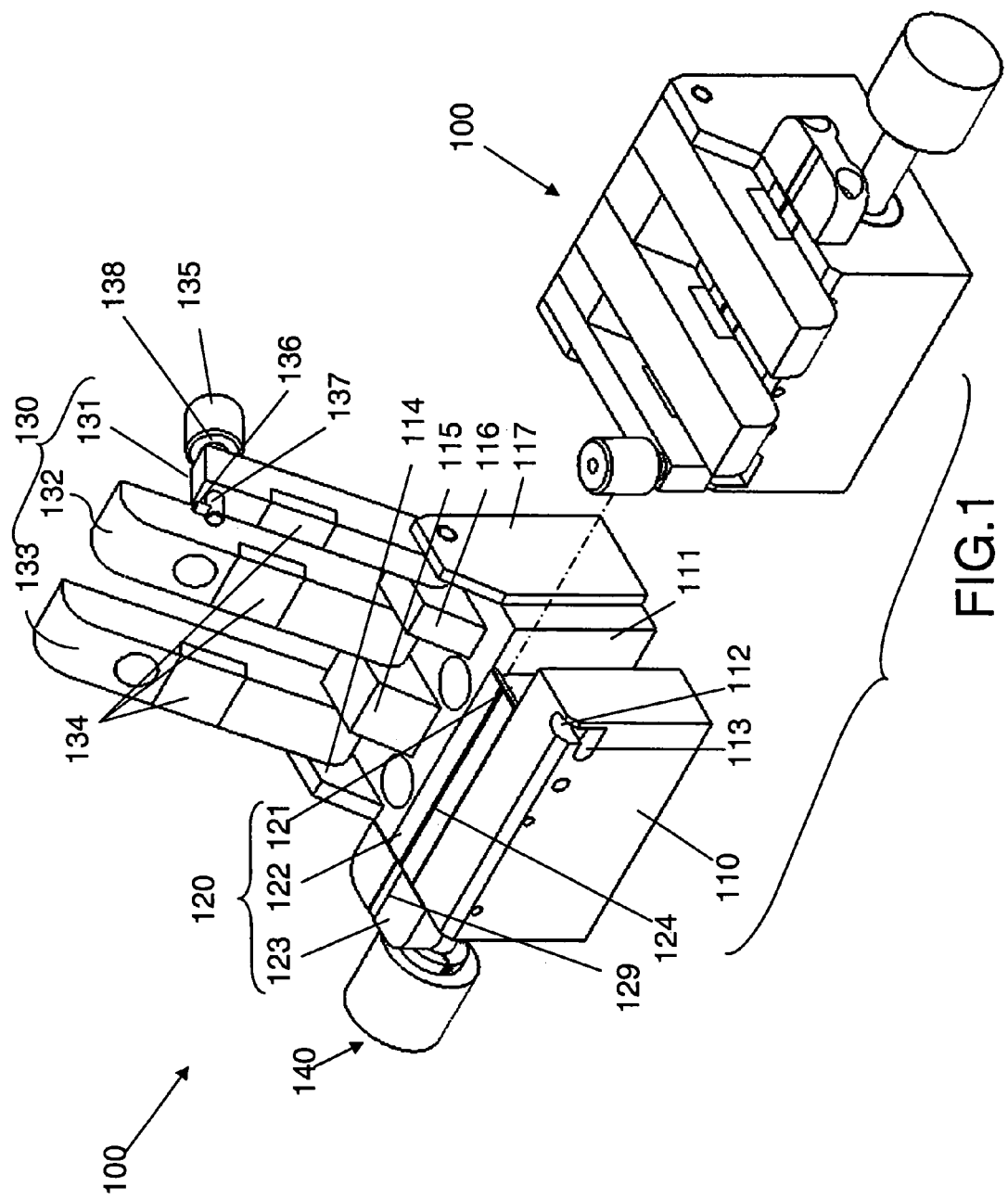
FIG. 1 is a schematic view of a first embodiment of the clamping device of the invention.

Referring to FIG. 1, the clamping device 100 includes a holding stage 110, a loading fixture 120, a clamping member 130 and a push rod 140.

Figure 2:
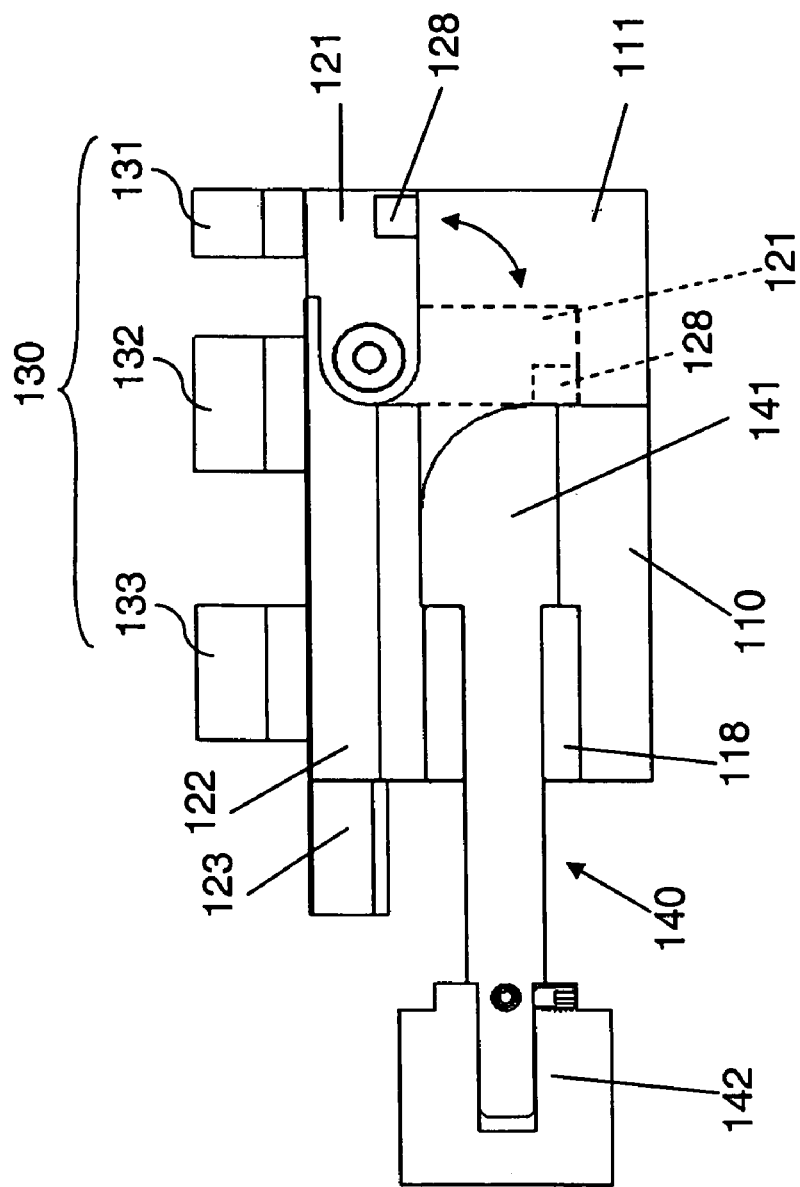
FIG. 2 is a sectional view of the first embodiment of the clamping device of the invention.

Referring to FIGS. 1 and 2, the holding stage 110 is made of metal and has a vertical trench 111. On a corner adjacent to the top surface of one side, there is a guiding slot 112 and an orienting slot 113 formed on one side. The top surface of the holding stage 110 further has pivot seats 114, 115, 116 and 117 to pivotally couple with the clamping member 130.

Figure 3:
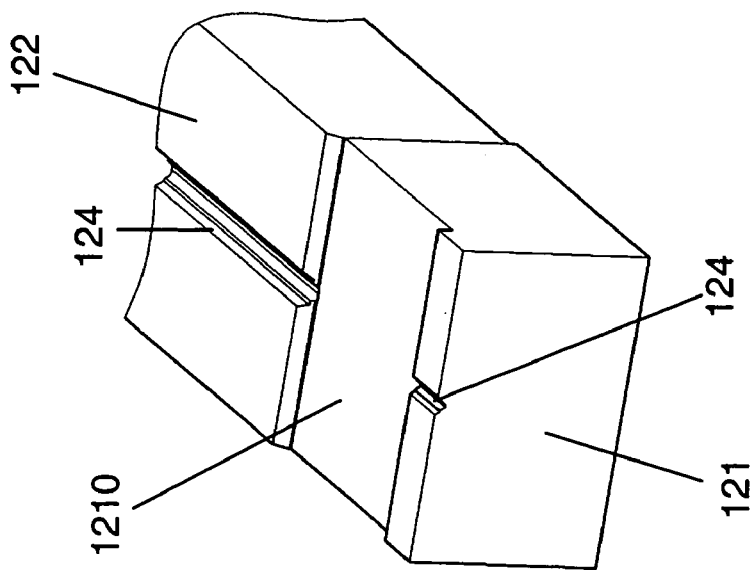
FIG. 3 is an enlarged schematic view of the packaging section and the anchoring section of the loading fixture of the first embodiment.

Referring to FIGS. 1 through 4, the loading fixture 120 is located on the top surface of the holding stage 110 opposing the trench 111. They may be integrally formed, or as shown in this embodiment, include a packaging section 121, an anchoring section 122 and a plane deck 123 extended from an outer end of the anchoring section 122. The packaging section 121 is pivotally coupled on the holding stage 110 as shown in FIG. 2, and is turning between a horizontal position and a vertical position in the trench 111. It has a magnet 128 on the bottom. When the packaging section 121 is positioned vertically, the magnet 128 attracts one side of the holding stage 110 through the magnetic force. The packaging section 121 further has a recess 1210 as shown in FIG. 3 that is sunk from the top surface of the packaging section 121 to form a selected area. It has one side abutting the anchoring section 122. The recess 1210 aims to facilitate peeling of the shell (not shown in the drawings) of the optical fibers. Referring to FIG. 1, the anchoring section 122 is fastened to the holding stage 110. The plane deck 123 aims to aid holding, and has a linear notch 129 on the top surface.

Figure 5:
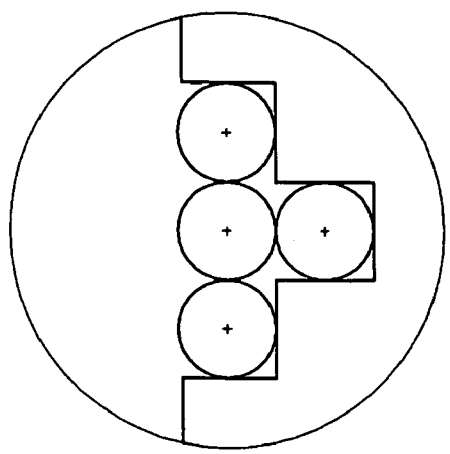
FIG. 5 is a schematic view of the arrangement of the loading fixture trough and optical fibers of a second embodiment.
Figure 4:
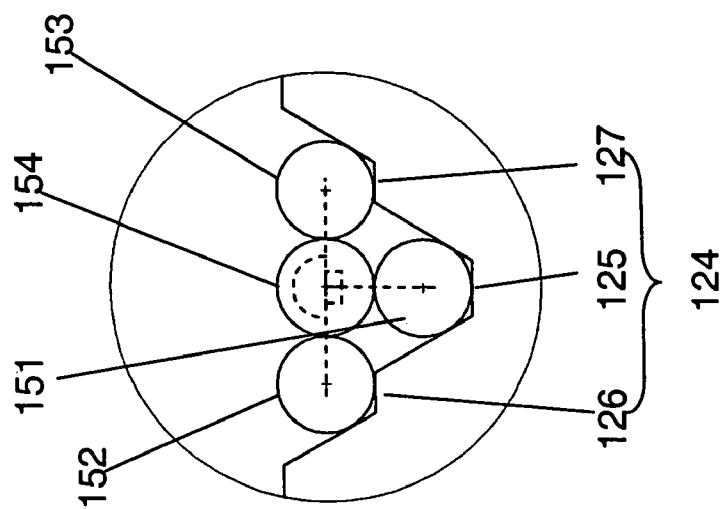
FIG. 4 is a schematic view of the arrangement of the loading fixture trough and optical fibers of the first embodiment.

The top surfaces of the anchoring section 122 and the packaging section 121 have a groove 124 to hold four optical fibers (referring to FIGS. 1, 3 and 4). The notch 129 of the plane deck 123 is abutting the groove 124 on the outer end of the anchoring section 122. The groove 124 has a first bottom surface 125, a second bottom surface 126 and a third bottom surface 127. The first bottom surface 125 is deeper than the second and third bottom surfaces 126 and 127, and they are formed in a stepwise manner. In FIG. 4, the sidewalls of the groove 124 are inclined. In practice, the sidewalls of the groove 124 may be in any shape desired, as long as they can hold the optical fibers. FIG. 5 shows a second embodiment in which the sidewalls are vertical. The bottom surfaces also may be formed in any shape desired, such as concave surfaces.

Referring to FIG. 4, for holding the optical fibers. Place a first optical fiber 151 on the first bottom surface 125, a second optical fiber 152 on the second bottom surface 126, and a third optical fiber 153 on the third bottom surface 127. Then place a fourth optical fiber 154 among and abutting the first optical fiber 151, second optical fiber 152 and third optical fiber 153. After the arrangement is finished, the top sides of the second, third and fourth optical fibers 152, 153 and 154 substantially coincide with the top surface of the anchoring section 122 or the packaging section 121.

The design of the groove of the loading fixture aims to form three included angles by connecting the centers of all optical fibers and with two of the included angles in the range of 90 and 120 degrees (in this embodiment, two are 90 degrees, while another is 180 degrees). The desired layout has a Y-shape or T-shape. A 1×4, 2×4 or 4×4 optical fiber coupler thus formed can split the optical signal evenly to all optical fibers. Besides the two stepwise groove previously discussed, the groove of other shapes may also be used, such as a V-shape groove coupled with a clamping arm that can hold the first, second, third and fourth optical fibers 151, 152, 153 and 154 in a T-shape or Y-shape.

In short, in the optical fiber coupler provided by the invention, the first optical fiber 151, second optical fiber 152 and third optical fiber 153 are located on the periphery of the fourth optical fiber 154. Moreover, the connection lines between the center of the centers of the fourth optical fiber 154 and the centers of the first optical fiber 151, second optical fiber 152, and third optical fiber 153 form three included angles in which two are ranged from 90 to 120 degrees.

Based on the loading fixture previously discussed, the invention provides a method for manufacturing optical fiber couplers. The method includes the following steps: (1) providing a loading fixture which has a groove; and (2) placing a first optical fiber, a second optical fiber, a third optical fiber and a fourth optical fiber in the groove with the fourth optical fiber located among and abutting the first optical fiber, second optical fiber and third optical fiber; and the connection lines of the centers of the fibers form three included angles in which two are ranged from 90 to 120 degrees. There is no limitation on the shape of the groove.

Referring to FIGS. 1 and 2, the clamping member 130 is pivotally coupled on one side of the top surface of the holding stage 110. It includes three clamping arms 131, 132 and 133 that are vertical to the longitudinal axis of the loading fixture 120. In practice, there is no limitation on the number of clamping arms. When the optical fibers, previously discussed, are held by the loading fixture 120, the clamping arms may be turned to cover and press the top surface of the loading fixture 120 to compress and anchor the arranged optical fibers in the groove 124.

In order to anchor the optical fibers securely, the clamping arms 131, 132 and 133 have respectively a compressing portion 134 on the bottom surface, corresponding to the loading fixture 120. The compressing portion 134 may be made from an elastic material such as rubber or the like. Another method to adjust the anchoring strength is through a handgrip 135 located on the top surface of a distal end of the clamping arm 131 as shown in FIG. 1. The handgrip 135 has a stem 136 running through the clamping arm 131 and exposing outside the bottom surface of the clamping arm 131. There is an elastic element 138 between the handgrip 135 and the stem 136. When the clamping arm 131 is turned downwards, the stem 136 slides in the guiding slot 112 of the holding stage 110 to be anchored (with the clamping arm 131 covering the packaging section 121 in a horizontal manner). The stem 136 may have a jutting tenon 137. When the clamping arm 131 reaches the compression position, turn the handgrip 135 to drive the stem 136, the jutting tenon 137 may be wedged in the orienting slot 113 of the holding stage 110. The elastic element 138 provides a selected extension force to maintain a selected compression force when the clamping arm 131 reaches the anchor position.

Referring to FIGS. 1 and 2, the push rod 140 is located beneath the loading fixture 120, and runs though the holding stage 110 horizontally. The push rod 140 has a front end to hold the packaging section 121 on a horizontal position as shown in FIG. 2 (with the packaging section 121 indicated by solid lines). When the push rod 140 is pulled away from the packaging section 121, the packaging section 121 may be turned from horizontal position to vertical position, and attracted by the magnet 128 to lean on an inner wall of the holding stage 110, as shown in FIG. 2 (with the packaging section 121 indicated by broken lines).

To limit the moving distance of the push rod 140, the push rod 140 has a head 141 on one end formed in a larger diameter, and a handle 142 on the other end formed in a greater diameter. The holding stage 110 has a retaining member 118 to house the push rod that has an inner diameter smaller than the outer diameter of the head 141 or the handle 142. In addition, the head 141 has an arched corner on the top surface, to facilitate turning of the packaging section 121 from vertical position to horizontal position.

Figure 7:
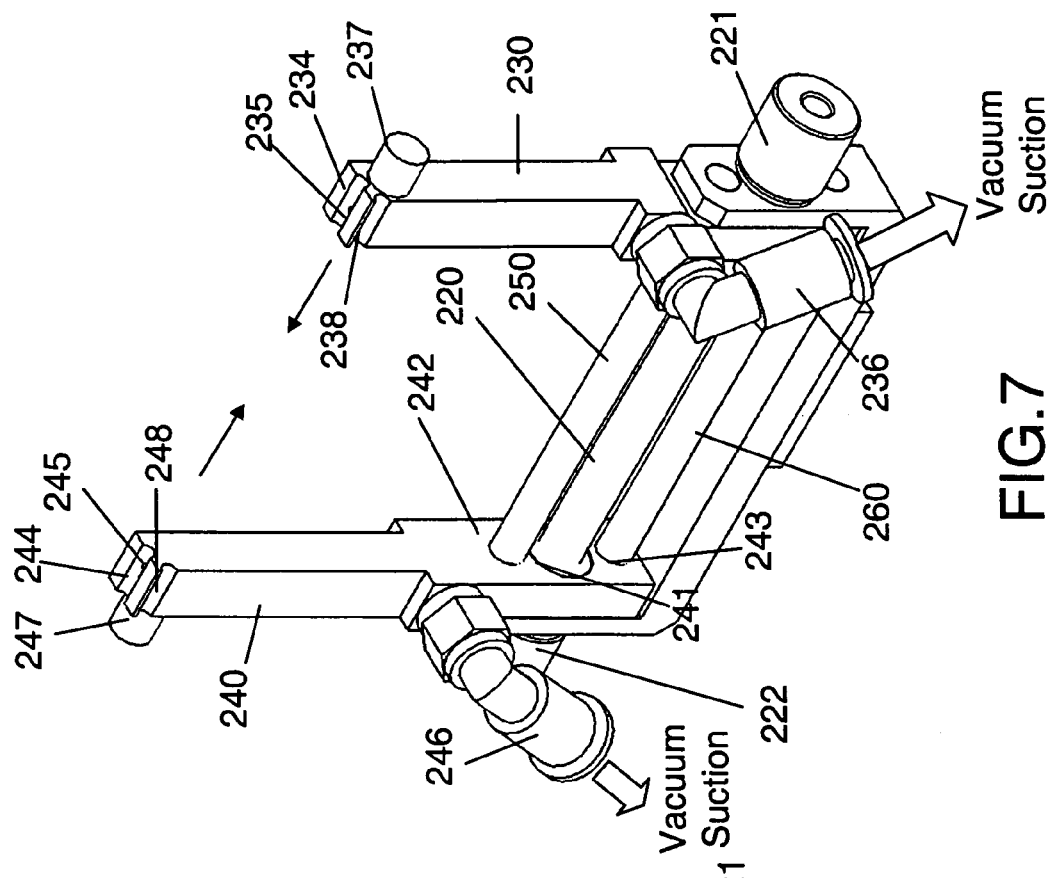
FIGS. 6 and 7 are schematic views of the packaging station and an operating condition of a third embodiment of the invention.
Figure 6:
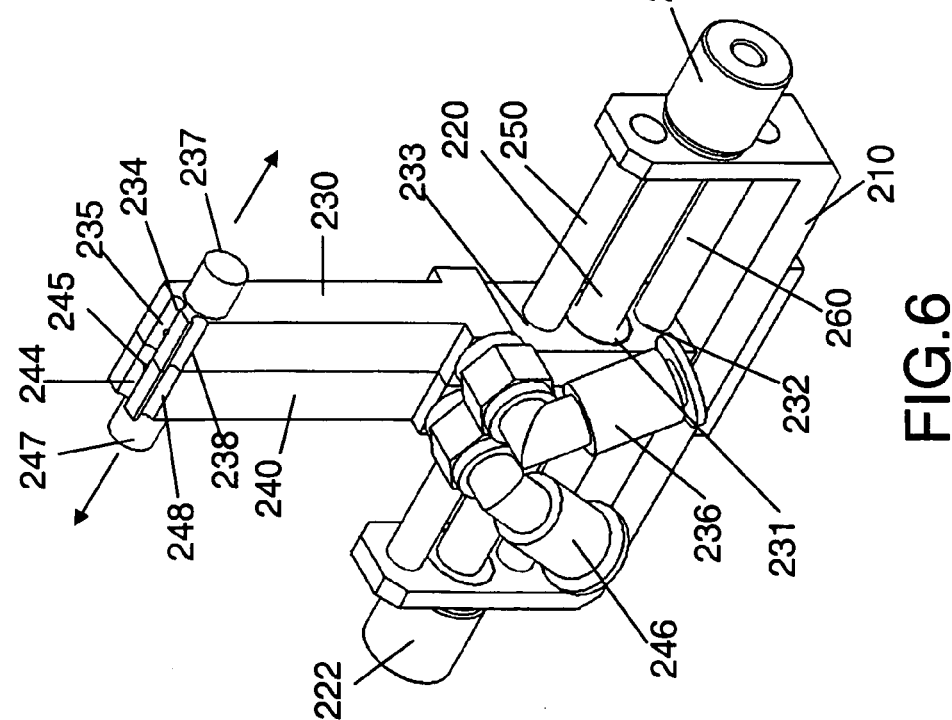

Refer to FIGS. 6 and 7 for a third embodiment of the packaging station 200 for fabricating optical fiber couplers. It includes a pedestal 210, a screw bar 220, carriers 230 and 240, and guiding rods 250 and 260.

The pedestal 210 is substantially formed in U-shape. The screw bar 220 runs through the pedestal 210 horizontally and has two ends extended outside the pedestal 210. The two distal ends of the screw bar 220 are coupled respectively with a rotary bar 221 and 222 of a larger diameter to be grasped for turning.

The carriers 230 and 240 are substantially vertical posts and have screw holes 231 and 241 of opposite screw threads to couple on the screw threads (not shown in the drawings) of the screw bar 220. The surface of the screw bar 220 has a left area and a right area with screw threads of opposite directions formed thereon. The guiding rods 250 and 260 run transversely through the pedestal 210 and anchor thereon in parallel with the screw bar 220. The carriers 230 and 240 have corresponding apertures 232, 233, 242 and 243 to allow the guiding rods 250 and 260 to pass through.

When the screw bar 220 is turned, the carriers 230 and 240 are moved horizontally relative to each other and reduce the distance between the carriers 230 and 240. Hence by coupling with a packaging baseboard of a selected length, the bare portion of the optical fibers may be packaged.

The carriers 230 and 240 have respectively an arched trough 234 and 244 on the top end to jointly hold a quartz tube (not shown in the drawings) which has a notch to serve as the "packaging substrate" for packaging the optical fibers.

Moreover, the carriers 230 and 240 have respectively through holes 235 and 245 running through the arched troughs 234 and 244 that have a bottom opening (not shown in the drawings) to couple respectively with a vacuum connector 236 and 246, to link to a vacuum machine (not shown in the drawings). Thereby, the arched troughs 234 and 244 can provide a vacuum suction force to hold the packaging substrate (quartz tube) securely in the arched troughs, 234 and 244, during the packaging process.

In addition, the carriers, 230 and 240, have respectively a ceramic heater, 237 and 247, on two sides of the top end to generate heat in the packaging process. The carriers, 230 and 240, have respectively a side trough, 238 and 248, on another side of the top end to hold a thermal sensor (not shown in the drawings) to control the heating temperature of the heating coils. In a desired condition, the packaging center of the optical finer coupler and the center of the thermal sensor are on the same concentric circle. The concentric circle has the center coinciding with the centers of the ceramic heaters, 237 and 247, so that temperature variation may be measured accurately.

Figure 8:
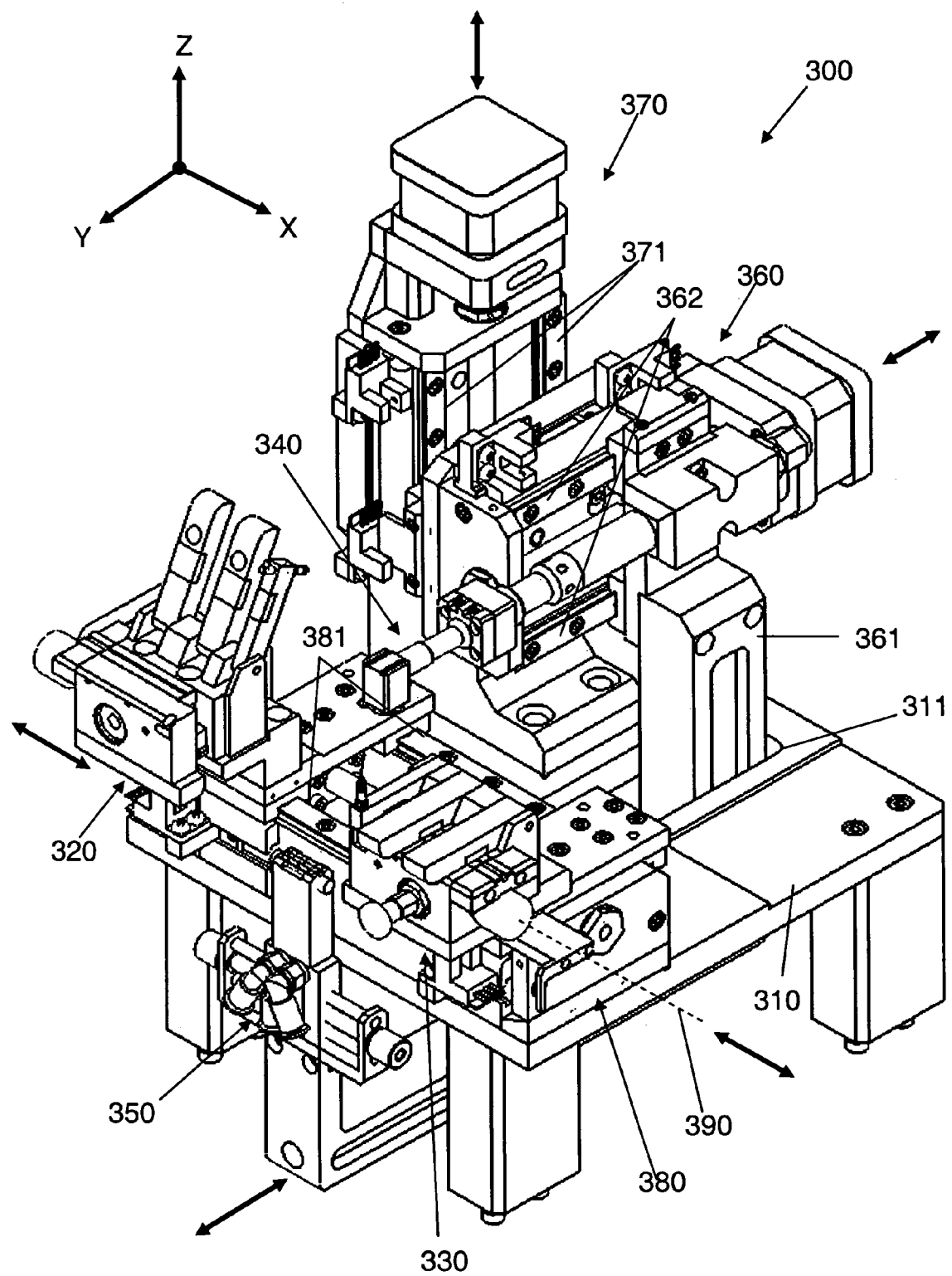
FIG. 8 is a schematic view of a fourth embodiment of the apparatus for manufacturing optical fiber couplers of the invention and an operating condition.

Refer to FIG. 8 for the entire structure of the apparatus 300 for manufacturing optical fiber couplers of the invention. It includes a base 310, clamping devices, 320 and 330, an optical fiber fusion splice device 340, a packaging station 350 and a plurality of conveying units that include a longitudinal conveying unit 360, a vertical conveying unit 370 and a clamping device conveying unit 380, to hold and transport the clamping devices, 320 and 330, optical fiber fusion splice device 340, and packaging station 350.

The optical fiber fusion splice device 340 provides high temperature to heat the bare portion of the optical fibers so that they may be stretched and allow the optical signal to be evenly split or coupled. The clamping devices, 320 and 330, are mounted onto a sliding track 381 of the clamping device conveying unit 380, and are movable in opposite directions relative to each other on an optical fiber stretching axis 390 (the broken line in the drawings) to stretch the bare portion of the optical fibers.

The base 310 holds the vertical conveying unit 370 and the clamping device conveying unit 380. It has a opening slot 311 to house a movable U-shape linkage bar 361. The linkage bar 361 has two ends connecting respectively to the packaging station 350 and the optical fiber fusion splice device 340. The optical fiber fusion splice device 340 and the linkage bar 361 are mounted onto a sliding track 362 of the longitudinal conveying unit 360 so that the optical fiber fusion splice device 340, linkage bar 361 and packaging station 350 are moved synchronously and horizontally. The longitudinal conveying unit 360 is mounted onto a sliding track 371 of the vertical conveying unit 370 so that the optical fiber fusion splice device 340, linkage bar 361, and packaging station 350 are driven by the longitudinal conveying unit 360, to move vertically. In this embodiment, two sets of conveying units are used, so that the optical fiber fusion splice device 340, linkage bar 361, and packaging station 350 may be moved in two dimensions. Similarly, another set of transverse conveying units (not shown in the drawings) may be added to increase the moving range and form a transmission system moving in three dimensions.

The objective of the aforesaid design is to move the packaging station 350 and optical fiber fusion splice device 340 synchronously, so that, while the optical fibers are stretched through the optical fiber fusion splice device 340, the packaging process performed by the packaging station 350 is done consecutively in a front side and rear side manner. Through such a design, when the front end of the optical fiber fusion splice device 340 is moved above the stretching axis 390 of the optical fibers, the optical fiber fusion splice device 340 is heating the optical fibers, and the packaging station 350 is moved away from the stretching axis 390. When the packaging process is proceeding, the packaging station 350 is moved beneath the stretching axis 390 of the optical fibers, and the optical fiber fusion splice device 340 is moved away from the stretching axis 390. By means of the synchronous design of the packaging station 30 and the optical fiber fusion splice device 340, their operations do not interfere with each other. Moreover, through the linkage bar 361, only one set of conveying units is required. The structure is simpler than the conventional techniques that require two independent conveying units.

In practice, the packaging station and the optical fiber fusion splice device are driven synchronously through a linkage bar and a conveying unit. Alterations may be made based on this design. For instance, connecting the packaging station and the optical fiber fusion splice device is not limited to the linkage bar. The connecting positions, or number, degree of freedom, shape of the conveying units, and driving method between the conveying units may also have varying choices.

Based on the optical fiber coupler previously discussed, the invention also provides a method for manufacturing optical fiber couplers. It includes the following step: (1) connecting the packaging station and the optical fiber fusion splice device through a linkage bar; and (2) moving the packaging station and the optical fiber fusion splice device synchronously through a conveying unit. When the front end of the optical fiber fusion splice device is moved above the optical fiber stretching axis, the packaging station is moved away from the optical fiber stretching axis. When the packaging station is moved below the optical fiber stretching axis, the optical fiber fusion splice device is moved away from the optical fiber stretching axis. The embodiments set forth above employ a conveying method that includes a vertical conveying unit and a longitudinal conveying unit to transport the packaging station and the optical fiber fusion splice device in vertical direction and horizontal direction. Or a transverse conveying unit may be added to couple with the vertical conveying unit and longitudinal conveying unit to move the packaging station and the optical fiber fusion splice device in three dimensions.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A loading fixture for manufacturing optical fiber couplers, comprising:
   a top surface which has a groove formed thereon, the groove holding a fourth optical fiber which is located among and abutting a first optical fiber, a second optical fiber and a third optical fiber;
   wherein connection lines between the center of the fourth optical fiber and the centers of the first optical fiber, the second optical fiber and the third optical fiber form three included angles, two of the three included angles being ranged from 90 degrees to 120 degrees.

2. The loading fixture of claim 1, wherein the groove has a first bottom surface, a second bottom surface and a third bottom surface, the first bottom surface having a depth greater than that of the second and the third bottom surfaces to become stepwise therewith, the first optical fiber being located on the first bottom surface, the second optical fiber being located on the second bottom surface, and the third optical fiber being located on the third bottom surface.

3. The loading fixture of claim 1 further including an anchoring section and a packaging section, the anchoring section being fastened to a holding stage, the packaging section having an inner end pivotally coupled on the holding stage and being turnable between a horizontal position and a vertical position.

4. An optical fiber coupler for splitting an optical signal to a first optical fiber, a second optical fiber, a third optical fiber and a fourth optical fiber, comprising:
   the first optical fiber, the second optical fiber and the third optical fiber are located on the periphery of the fourth optical fiber, connection lines between the center of the fourth optical fiber and the centers of the first optical fiber, the second optical fiber and the third optical fiber form three included angles, two of the three included angles being ranged from 90 degrees to 120 degrees.

* * * * *